Feb. 6, 1940.   A. O. SCHUMAN   2,189,253
WHEEL SCRAPER
Filed March 10, 1939
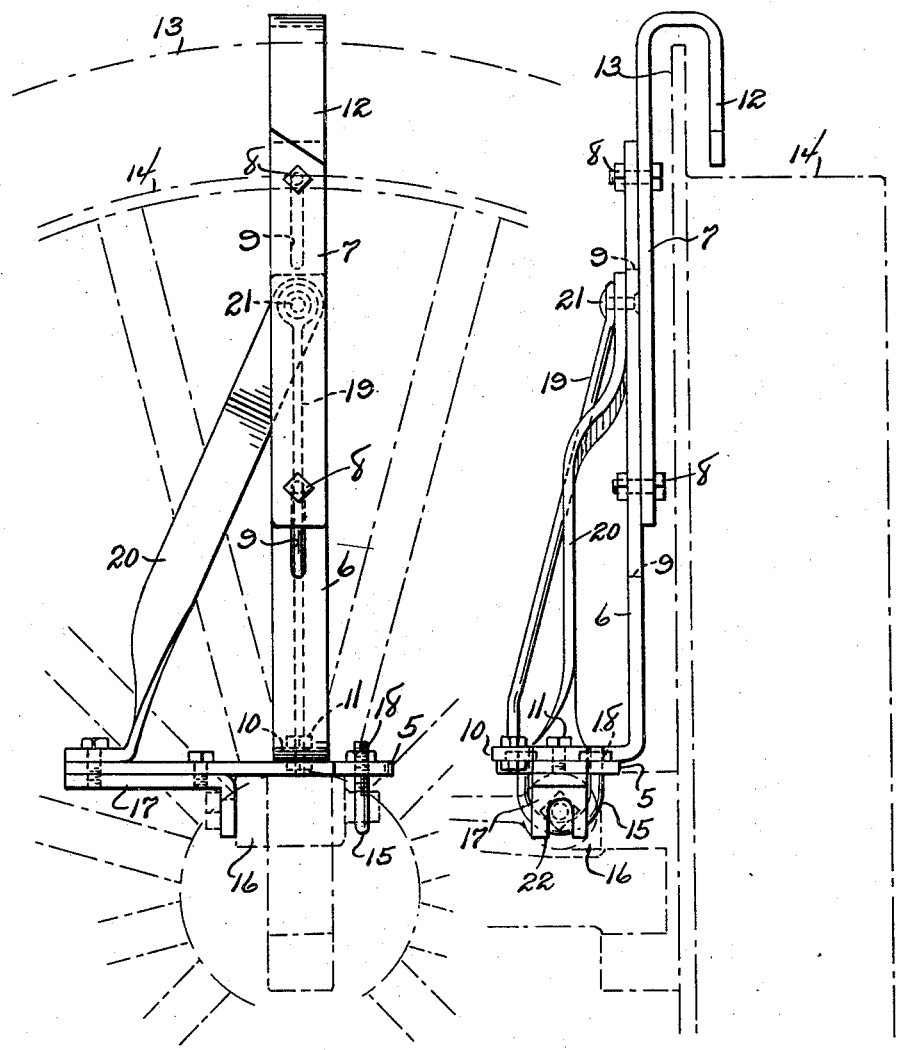
August O. Schuman
INVENTOR
BY Victor J. Evans & Co.
ATTORNEYS Patented Feb. 6, 1940

2,189,253

UNITED STATES PATENT OFFICE 2,189,253

WHEEL SCRAPER

August O. Schuman, Palisade, Nebr.

Application March 10, 1939, Serial No. 261,110

1 Claim. (Cl. 280—158)

The invention relates to a wheeled scraper and more especially to a steering arm skid ring cleaner for front wheels of tractors.

The primary object of the invention is the provision of a scraper or cleaner of this character, wherein the same is mountable in relation to the skid ring of a vehicle wheel, especially tractors, so that mud and other matter collected upon the tread of the wheel can be readily cleaned therefrom while the wheel is in motion or turning.

Another object of the invention is the provision of a scraper or cleaner of this character, wherein the same is readily adjustable to accommodate itself to the diameter of a wheel and also for the positioning thereof with relation to the skid ring of such wheel so that a cleaning action will be set up for removing mud or other matter accumulated at the tread of the wheel and particularly the skid ring thereof.

A further object of the invention is the provision of a scraper or cleaner of this character, which is simple in its construction, readily and easily mounted upon a vehicle for coaction with the wheel having the skid ring, thoroughly reliable and efficient in operation, easy of adjustment, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side elevation of the scraper or cleaner, constructed in accordance with the invention and in working position.

Figure 2 is an edge elevation thereof.

Similar reference characters indicate corresponding parts throughout the several views in the drawing.

Referring to the drawing in detail, the scraper or cleaner comprises a supporting plate or member 5 made from a flat strap- or strip-like metal for a sectional scraper arm including the sections 6 and 7, respectively, these being adjustably connected with each other by fasteners 8, the sections having slots 9 for such fasteners 8 allowing adjustment thereof with relation to each other. The section 6 is formed with a foot extension 10 at right angles thereto and such extension is made secure by a fastener 11 to the plate or member 5.

The section 7 is formed with a substantially goose-neck shaped or a substantially U-shaped scraper end 12 which saddles the skid ring 13 of a traction wheel 14, only a portion of the latter with the ring being shown, so that when the wheel is rotated and the scraper or cleaner in working position the skid ring will be cleaned to remove mud and other matter adhering thereto.

The plate or member 5 has fitted therewith a yoke-like clamp 15 for engaging the steering knuckle 16 of a steering assembly for the wheel 14. This plate or member 5 also has attached thereto a retaining bracket 17 made secure, as at 18, to the knuckle 16, the clamp 15 being at one side while the bracket 17 is at the other side of said knuckle, and in this manner the plate or member 5 is fixedly held for sustaining the scraper or cleaner in working position with respect to the wheel 14 and turnable therewith in the steering operation of said wheel.

Attached to the plate or member 5 are the braces 19 and 20, respectively, these being angle braces and are joined by a common fastener 21 to the section 6 before described so that the arm including these sections will be sustained in an upright vertical position and firmly braced for scraping activity in the use of the scraper or cleaner.

The bracket 17 is formed with a forked end 22 accommodating the fastener 18 and this end 22 enables the convenient removal and fastening of the scraper or cleaner to the knuckle 16 before referred to in the detachment and mounting of said scraper or cleaner.

What is claimed is:

A scraper or cleaner for a wheel having a skid ring and a steering knuckle fitting, comprising an adjustable arm having a scraper end saddling the skid ring, a supporting plate carrying said arm, means separably engageable with the knuckle fitting at opposite sides thereof for the fastening of the supporting plate in fixed position and holding the arm vertically upright, braces between the arm and said supporting plate, and means for adjusting the said arm.

AUGUST O. SCHUMAN.